United States Patent
Gonneaud et al.

(10) Patent No.: US 6,474,578 B1
(45) Date of Patent: Nov. 5, 2002

(54) SAFETY DEVICE FOR FOOD PROCESSOR

(75) Inventors: Patrick Gonneaud, St. Vallier (FR); Jean-Pierre Lazzer, Montchanin (FR)

(73) Assignee: Robot Coupe, Vincennes (FR)

( * ) Notice: Subject to any disclaimer, the term of this patent is extended or adjusted under 35 U.S.C. 154(b) by 0 days.

(21) Appl. No.: 09/718,582

(22) Filed: Nov. 22, 2000

(30) Foreign Application Priority Data

Nov. 25, 1999 (FR) .............................. 99 14827

(51) Int. Cl.⁷ ............................................ B02C 25/00
(52) U.S. Cl. .................................. 241/37.5; 241/282.1
(58) Field of Search .................. 366/206; 241/37.5, 241/36, 282.1, 282.2

(56) References Cited

U.S. PATENT DOCUMENTS

| | | | |
|---|---|---|---|
| 4,216,917 A | * | 8/1980 | Clare et al. .............. 241/282.1 |
| 4,269,519 A | | 5/1981 | Birr |
| 4,373,677 A | | 2/1983 | Kunihiro .................... 241/37.5 |
| 5,037,033 A | | 8/1991 | Stottmann et al. ......... 241/37.5 |

FOREIGN PATENT DOCUMENTS

GB    1 380 318    1/1975

* cited by examiner

Primary Examiner—Mark Rosenbaum
(74) Attorney, Agent, or Firm—Duane Morris LLP

(57) ABSTRACT

A safety push-button keypad for a food processor has a base with an electric motor and its command circuit operated by a push-button key pad. A removable container is mounted on the base and can be closed with a cover. The cover has a cam that comes to rest, when the cover is locked onto the container, on the end of a stem running into a housing extending along an axis relative to the container, which can be cylindrical. Above the stem and in its extension extends a piston on which is fixed a microswitch mounted running into the base, a related push button corresponding with a lever coming to bear, when the piston is down, on the contact of the microswitch.

3 Claims, 2 Drawing Sheets

SAFETY DEVICE FOR FOOD PROCESSOR

The purpose of the present invention is a safety push-button pad intended in particular but not exclusively, for kitchen appliances such as food processors.

Using a food processor, with tools mounted on the motor shaft, one can do a variety of tasks such as cutting, chopping, blending, mixing, etc.

FR-A-2 146 361 (VERDUN) described a food processor comprising a base containing an electric motor, from the surface of which the motor shaft protrudes into a removable container inside of which various tools can be operated at different times.

In order to avoid hands coming in contact with moving tools, the processor can only operate if a cover is in position on the container. This result is obtained by equipping the cover with a cam coming to bear, when the cover is properly placed on the container, on the upper end of a stem disposed along an axis relative to or generated from the container, which can be cylindrical. The lower end then passes through the base to come to bear on a switch connected in series in the feed circuit of the motor. This is the safety function.

The appliance is usually turned on with a push-button. The keypad of such appliances usually has three buttons, marked ON, OFF and PULSE. The ON button provides continuous operation of the appliance, which is only stopped by pushing the OFF button. The PULSE button, for short periods of work, only runs the motor for as long as the button is pressed down. But certain simplified keypads only have one button.

This is to say that the operating and safety functions are carried out by two independent organs. The purpose of the invention is to remedy this inconvenience and to make operation of such appliances safer by combining means for operation and safety.

Accordingly, the invention comprises a safety keypad for a food processor comprising a base containing an electric motor and its command circuit operated by a push-button keypad, a removable container mounted on the base that can be closed with a cover, the cover including a cam that comes to bear, when the cover is locked on to the container, on the end of a stem running into a housing extending according to a generator of the cylindrical container, and is characterized by the fact that, above the stem and in its elongation, a piston interdependent with a microswitch is mounted running into the base, a related button corresponding with a lever coming to bear, through pressing on the corresponding button, on the control of the microswitch.

According to another characteristic of the invention, the lever associated with the button is mounted pivoting on the inside of the base and presents a plane supporting surface on the contact button of the microswitch.

Figure 1:
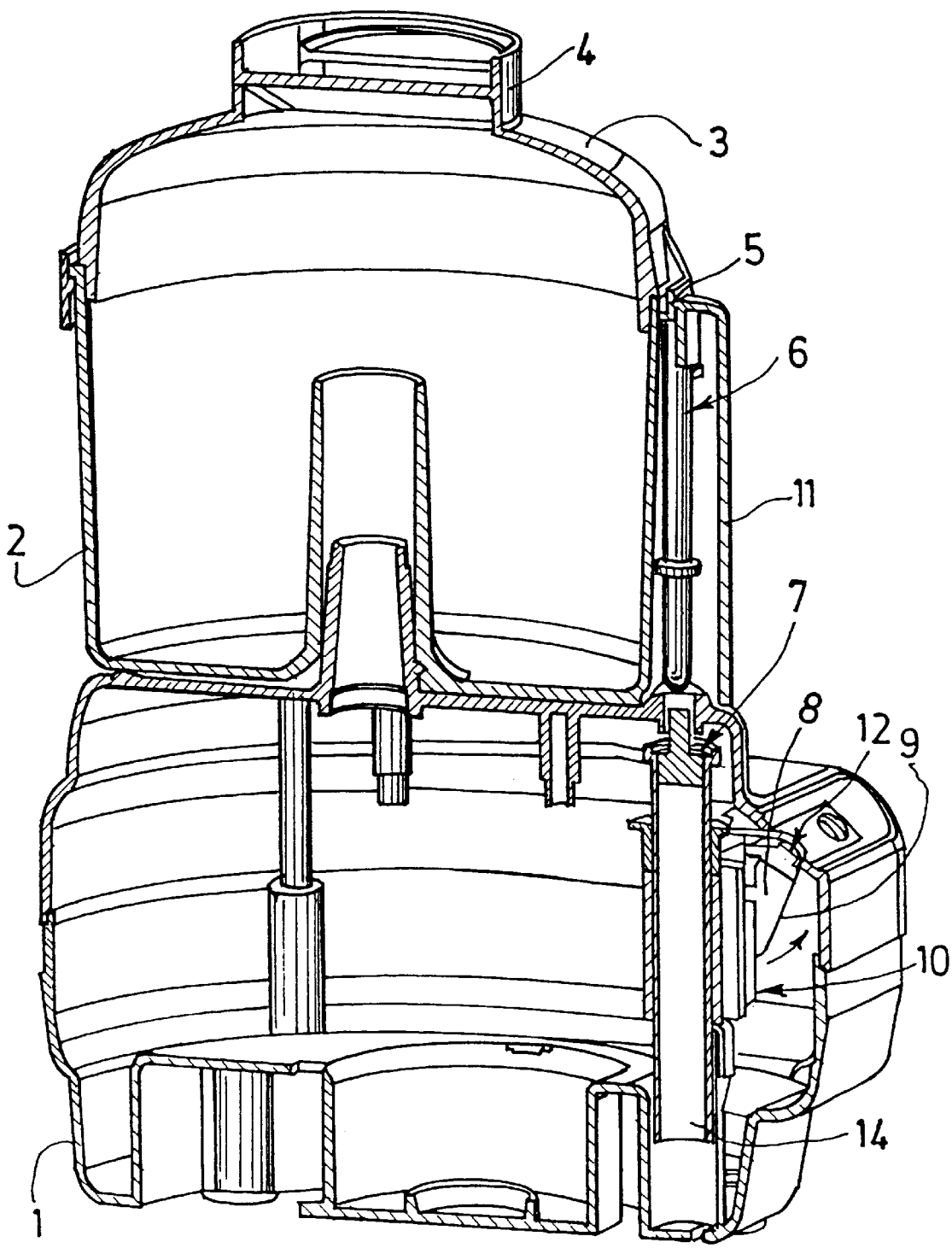
Figure 2:
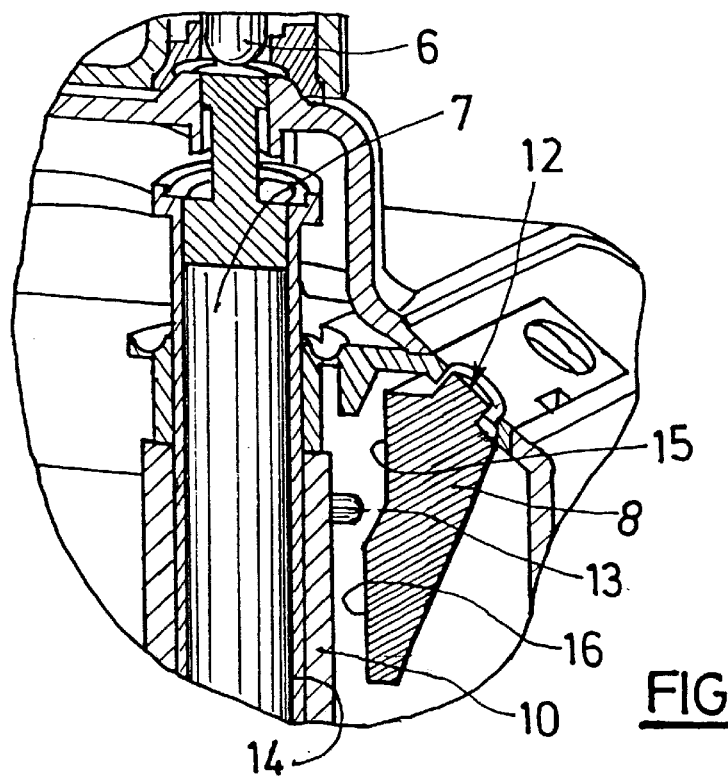
Figure 3:
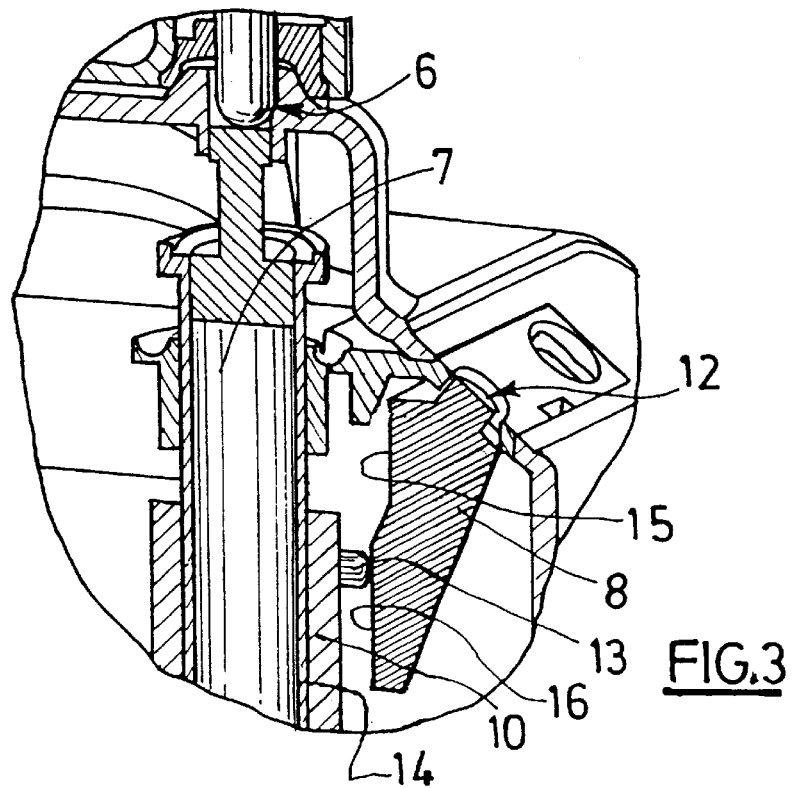

Other characteristics and advantages of the invention will appear in the course of the following description of a particular method of use, given solely as a non-limiting example, by looking at the diagrams, which represent:

FIG. 1, - a cross-section view of a food processor, equipped with the invention, not in operation;

FIG. 2, an enlarged detailed view of the safety device in the same position;

FIG. 3, a detailed view, identical to FIG. 2, with the processor in operation.

On all these figures, the same reference numbers indicate the same elements. FIG. 1 shows a vertical cross section of a food processor comprising a base 1 containing an electric motor (not shown), the output shaft of which the projects into the interior of the container. On the base 1 is mounted a removable cylindrical working container 2 fixed, for example, by means of a bayonet closure. On the cylinder 2 is mounted a cover 3 which preferably has a feed tube 4 for putting in products or ingredients.

The cover 3 itself has on one side a cam 5 that works with the upper end of a stem 6 enclosed in a housing 11 formed according to a generator of the container. The stem 6 is constantly pressed upwards by a spring (not shown). When the food processor is not in use, the stem 6 and the piston 7 are in the up position. When the container 2 is set on the base 1 and the cover 3 is closed (operating position), the stem 6 descends towards the bottom of the figure and comes to rest on the end of a piston 7 located in the base and also moved upwards by a spring (not shown).

As is more clearly shown on FIGS. 2 and 3, and according to the invention, a microswitch 10, turned on and off by a movable button 13, is mounted on the piston 7 by means of a support 14. The command switch 12 is in contact with a lever 8. According to the invention, the lever 8, usually triangular in shape, is articulated within the base. It includes, on its longest side, a recess 15 formed under a flat projecting surface 16. When at rest, that is, when the stem 6 is not resting on the piston 7, the button 13 is opposite the recess 15 (FIG. 2) so that pressing on the button 12 has no effect on the microswitch since the lever 8 does not come in contact with the button 13.

Contrarily, when the piston 7 descends it brings the button 13 opposite the flat surface 16. At this moment, pressing on the button 12 closes the microswitch and the motor starts. This operation continues until the button 12 is released.

The preceding description concerns cases where only one on/off button is used. Where there are several buttons, it is possible to obtain the desired results using small connecting rods.

According to another characteristic of the invention, the piston is grooved so that liquids that may possibly get into the base through the hole for the stem, flow inside the piston, run into a pocket in the base and flow out through a small opening in the bottom of the base.

Needless to say, many variants may be made, in particular by substitution of equivalent technical methods, without going beyond the context of the invention.

What is claimed is:

1. A safety push-button keypad for a food processor, comprising a base enclosing an electric motor and a control circuit by means of a push-button pad, a removable container on the base that can be closed with a cover, the cover including a cam that comes to rest, when the cover is locked onto the container, on an end of a stem running through a housing extending along an axis relative to the container, characterized in that, above the stem and in an extension of the stem, a piston is mounted running into the base, a microswitch being fixed on the piston, a related button corresponding with a lever coming in contact, when the piston is in a down position, with a contact button of the microswitch.

2. The safety push-button keypad for a food processor according to claim 1, characterized in that the lever associated with the button is mounted to pivot on an inside of the base and presents a plane supporting surface on the contact button of the microswitch.

3. The safety push-button keypad for a food processor according to claim 1 or 2, characterized in that the piston is grooved.

* * * * *